(12) United States Patent
Copeland

(10) Patent No.: US 10,761,237 B1
(45) Date of Patent: Sep. 1, 2020

(54) SYSTEM AND METHOD FOR DETECTING UNDERGROUND ANOMALIES

(71) Applicant: COPELAND RESOURCES, INC., Austin, TX (US)

(72) Inventor: Charles David Copeland, Austin, TX (US)

(*) Notice: Subject to any disclaimer, the term of this patent is extended or adjusted under 35 U.S.C. 154(b) by 0 days.

(21) Appl. No.: 16/453,886

(22) Filed: Jun. 26, 2019

(51) Int. Cl.
| | |
|---|---|
| G01V 7/04 | (2006.01) |
| G01V 7/08 | (2006.01) |
| G01F 23/68 | (2006.01) |
| G01F 23/72 | (2006.01) |
| G05D 23/01 | (2006.01) |

(52) U.S. Cl.
CPC ............ *G01V 7/04* (2013.01); *G01F 23/68* (2013.01); *G01F 23/72* (2013.01); *G01V 7/08* (2013.01); *G05D 23/015* (2013.01)

(58) Field of Classification Search
CPC .......... G01F 23/68; G01F 23/72; G01V 7/08; G01V 7/04
See application file for complete search history.

(56) References Cited

U.S. PATENT DOCUMENTS

| | | | | |
|---|---|---|---|---|
| 2,899,826 A | * | 8/1959 | La Coste | ............... G01V 7/02 73/382 R |
| 5,564,276 A | * | 10/1996 | Abadilla | ............... F25B 21/04 136/204 |
| 6,076,409 A | * | 6/2000 | Bang | ............... G01L 19/0038 73/756 |
| 6,526,825 B2 | | 3/2003 | Manson | |

* cited by examiner

*Primary Examiner* — Paul M. West
(74) *Attorney, Agent, or Firm* — Hulsey P.C.

(57) ABSTRACT

Disclosed is a detector system for detecting underground anomalies comprising a detector device which includes a fluid chamber which is sealed; a float including a target, positioned within the fluid chamber; and a shielded phase shift proximity sensor configured to detect a distance between the target and proximity sensor, wherein a presence of an underground anomaly is determined based on the detected distance.

18 Claims, 13 Drawing Sheets

(4 of 13 Drawing Sheet(s) Filed in Color)

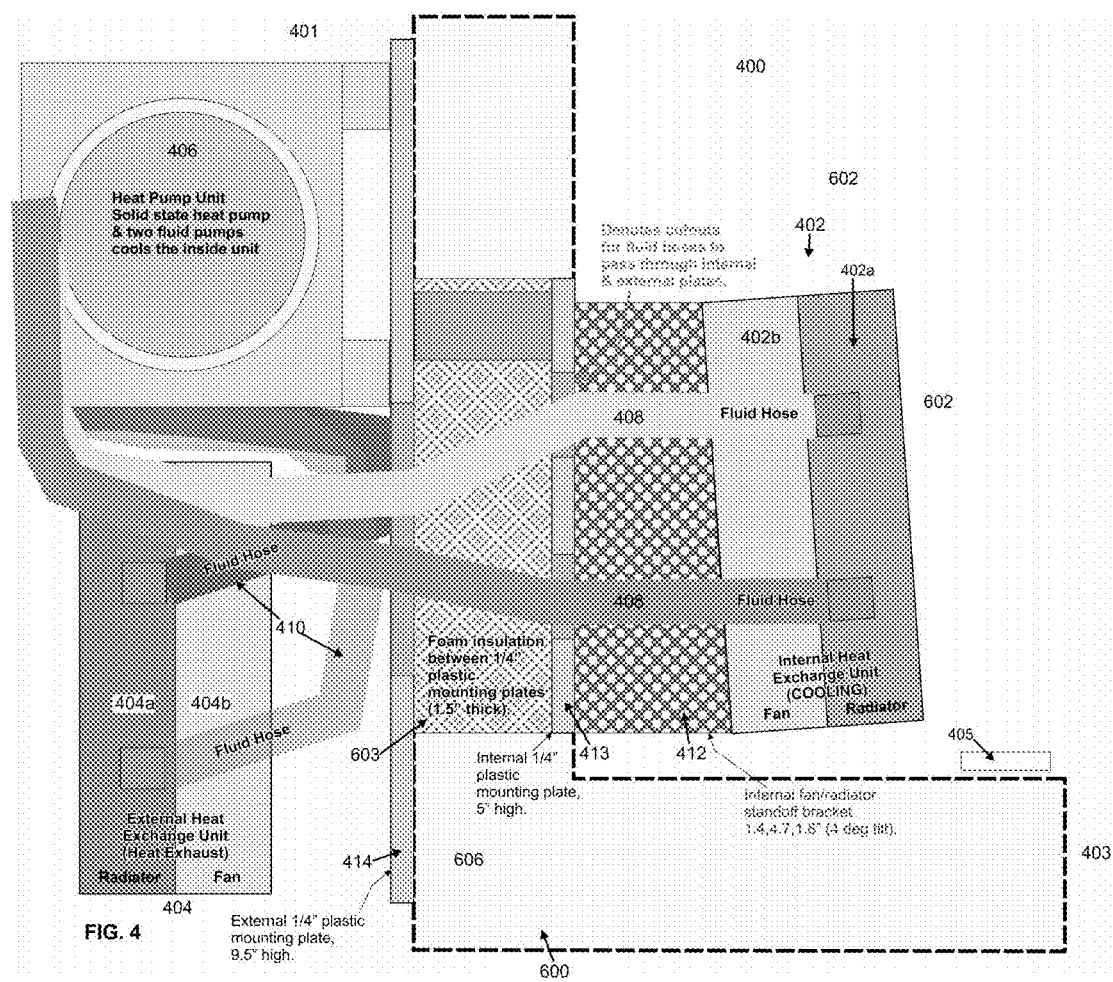

SYSTEM AND METHOD FOR DETECTING UNDERGROUND ANOMALIES

FIELD OF THE DISCLOSURE

The present disclosure relates to a system and method for detecting underground anomalies.

BACKGROUND OF THE DISCLOSURE

Detection of underground anomalies may have a variety of benefits and applications. However, providing a viable system, which enables accurate and efficient detection, poses many challenges. As such, there is a need for an improved system for detecting the presence of underground anomalies.

SUMMARY

According to various embodiments, disclosed is a detector system for detecting underground anomalies, which may comprise: a detector device, comprising: a housing; a fluid chamber within said housing, the fluid chamber containing a fluid, wherein said fluid chamber is sealed; a float positioned within the fluid chamber, said float comprising a sealed chamber having an upper end and a lower end with a target attached at the lower end, wherein said float is configured for free floating movement in said fluid; a proximity sensor within said housing, said proximity sensor positioned beneath said target and configured to detect a distance of said target from said proximity sensor, wherein a presence of an underground anomaly is determined based on said detected distance.

In some embodiments, the proximity sensor is a shielded phase shift proximity sensor. In further embodiments, the fluid is a hydrocarbon fluid. In some embodiments, the detector may further comprise a centralizer for centering the float and/or target. In some embodiments, the detector system may further comprise a leveling system comprising a tilt sensor configured to sense a tilt of the detector device. In further embodiments, the leveling system comprises an automated leveling gimbal in communication with the tilt sensor, and configured to level the device.

In some embodiments, the detector system may further comprise an automated temperature control system, wherein the automated temperature control system includes a) a cooling system and/or a heating system, at least one temperature probe configured to measure a temperature inside or around the device, and a control system configured to control the cooling system and/or heating system based on temperature information received from the at least one temperature probe. In further embodiments, the cooling system comprises a dual heat exchange system comprising at least two fluid pumps, and a thermoelectric heat pump between the fluid pumps.

According to various embodiments, disclosed is a detector system for detecting underground anomalies which may comprise: a detector device, comprising: a housing; a fluid chamber within said housing, the fluid chamber containing a fluid, a float positioned within the fluid chamber, said float having an upper end and a lower end with a target attached at the lower end, wherein said float is configured for free floating movement in said fluid; a proximity sensor within said housing, said proximity sensor positioned beneath said target and configured to detect a distance of said target from said proximity sensor; an automated temperature control system, wherein the automated temperature control system includes a) a cooling system and/or a heating system, at least one temperature probe configured to measure a temperature inside or around the device, and a control system configured to control the cooling system and/or heating system based on temperature information received from the at least one temperature probe, wherein a presence of an underground anomaly is determined based on said detected distance.

In some embodiments, the cooling system comprises a dual heat exchange system comprising at least two fluid pumps, and a thermoelectric heat pump between the fluid pumps. In further embodiments, the detector system is contained in an insulated housing. In yet further embodiments, the proximity sensor is a shielded phase shift proximity sensor. In some embodiments, the detector may further comprise a centralizer for centering the float and/or target.

In some embodiments, the detector system may further comprise a leveling system comprising a tilt sensor configured to sense a tilt of the detector device. In some embodiments, the leveling system further comprises an automated leveling gimbal in communication with the tilt sensor, and configured to level the device.

According to various embodiments, disclosed is a detector system for detecting underground anomalies which may comprise: a detector device, comprising: a housing; a fluid chamber within said housing, the fluid chamber containing a fluid; a float positioned within the fluid chamber, said float comprising a chamber having an upper end and a lower end with a target attached at the lower end, wherein said float is configured for free floating movement in said fluid; a proximity sensor within said housing, said proximity sensor positioned beneath said target and configured to detect a distance of said target from said proximity sensor; and a leveling system comprising a tilt sensor configured to sense a tilt level of the detector device, wherein a presence of an underground anomaly is determined based on said detected distance.

In some embodiments, the leveling system further comprises an automated leveling gimbal in communication with the tilt sensor, and configured to level the device. In further embodiments, the fluid is a hydrocarbon fluid. In some embodiments, the detector may further comprise a centralizer for centering the float and/or target. In further embodiments, the detector system is contained in an insulated housing.

According to various embodiments, disclosed is a detector system for detecting underground anomalies, which may comprise: a detector device which includes a fluid circulation chamber containing a fluid, said chamber having an upper end and a lower end, wherein the fluid contained in the fluid circulation chamber comprises a balancing fluid, and wherein the fluid circulation chamber is sealed; a float positioned within the fluid circulation chamber, said float comprising a sealed chamber having an upper end and a lower end with a target attached at the lower end, wherein the float is configured for free floating movement in said fluid; a proximity sensor coupled to and/or integral with said lower end of said fluid circulation chamber, said proximity sensor is positioned beneath said target and configured to detect a distance between said target and said proximity sensor, wherein the proximity sensor is a shielded phase shift proximity sensor; wherein a presence of an underground anomaly is determined based on said detected distance.

According to various embodiments, disclosed is a method of detecting an underground anomaly which may comprise: a) placing a detector device above a ground area, the detector device comprising: a fluid circulation chamber containing a fluid, said chamber having an upper end and a lower end, wherein the fluid contained in the fluid circulation chamber comprises a fluid; a float positioned within the fluid circulation chamber, said float comprising a sealed chamber having an upper end and a lower end with a target attached at the lower end, wherein said float is configured for free floating movement in said fluid; a proximity sensor coupled to and/or integral with said lower end of said fluid circulation chamber, said proximity sensor is positioned beneath said target and configured to detect a distance between said target and said proximity sensor; and b) detecting a presence of said anomaly beneath said ground area based on a detected distance reading by said proximity sensor. In some embodiments, the sensor may be a shielded phase shift proximity sensor.

In some embodiments, the underground anomalies comprise hydrocarbons, hydrocarbon bearing formations, faults, voids, and/or disturbances underground. In some embodiments, the method may further comprise combining a sensor reading with known geographical, geophysical, and/or geological data. In some embodiments, the method may further comprise generating a visual representation of the generated sensor readings. In some embodiments, the visual representation uses a location of each reading determined via GPS to map the data.

BRIEF DESCRIPTION OF THE DRAWINGS

The patent or application file contains at least one drawing executed in color. Copies of this patent or patent application publication with color drawings(s) will be provided by the Office upon request and payment of the necessary fee.

The present subject matter will now be described in detail with reference to the drawings, which are provided as illustrative examples of the subject matter so as to enable those skilled in the art to practice the subject matter. Notably, the FIGUREs and examples are not meant to limit the scope of the present subject matter to a single embodiment, but other embodiments are possible by way of interchange of some or all of the described or illustrated elements and, further, wherein:

FIG. 4 is a schematic view of a temperature control subsystem for the detector system of FIG. 1, in accordance with various embodiments;

DETAILED DESCRIPTION OF ILLUSTRATIVE EMBODIMENTS

The detailed description set forth below in connection with the appended drawings may be intended as a description of exemplary embodiments in which the presently disclosed process can be practiced. The term "exemplary" used throughout this description means "serving as an example, instance, or illustration," and should not necessarily be construed as preferred or advantageous over other embodiments. The detailed description includes specific details for providing a thorough understanding of the presently disclosed method and system. However, it will be apparent to those skilled in the art that the presently disclosed process may be practiced without these specific details. In some instances, well-known structures and devices are shown in block diagram form in order to avoid obscuring the concepts of the presently disclosed method and system.

In the present specification, an embodiment showing a singular component should not be considered limiting. Rather, the subject matter preferably encompasses other embodiments including a plurality of the same component, and vice-versa, unless explicitly stated otherwise herein. Further, the present subject matter encompasses present and future known equivalents to the known components referred to herein by way of illustration. It is further noted that the term "approximately" as used herein refers to +/−10% of the stated value, unless explicitly stated otherwise herein.

Disclosed is an improved system and method for detecting underground anomalies such as hydrocarbons, faults, voids, caves, underground disturbances, sinkholes, sewer lines, etc., and characteristics of such anomalies.

According to various embodiments, the disclosed system and method improves detection accuracy by minimizing disturbances due to atmospheric pressure changes and/or magnetic and electric field changes. According to further embodiments, the disclosed system and method is robust and can withstand transport over rugged terrain. In yet further embodiments, the disclosed system and method is unaffected by variations in atmospheric temperature. In some embodiments, the disclosed system and method is easily transportable. In further embodiments, the disclosed system and method easily coordinates detection data with location. In yet further embodiments, the disclosed system and method facilitates interpretation of the data. In yet further embodiments, the disclosed system and method is easy to use, and requires minimal calibration and/or maintenance.

Figure 1:
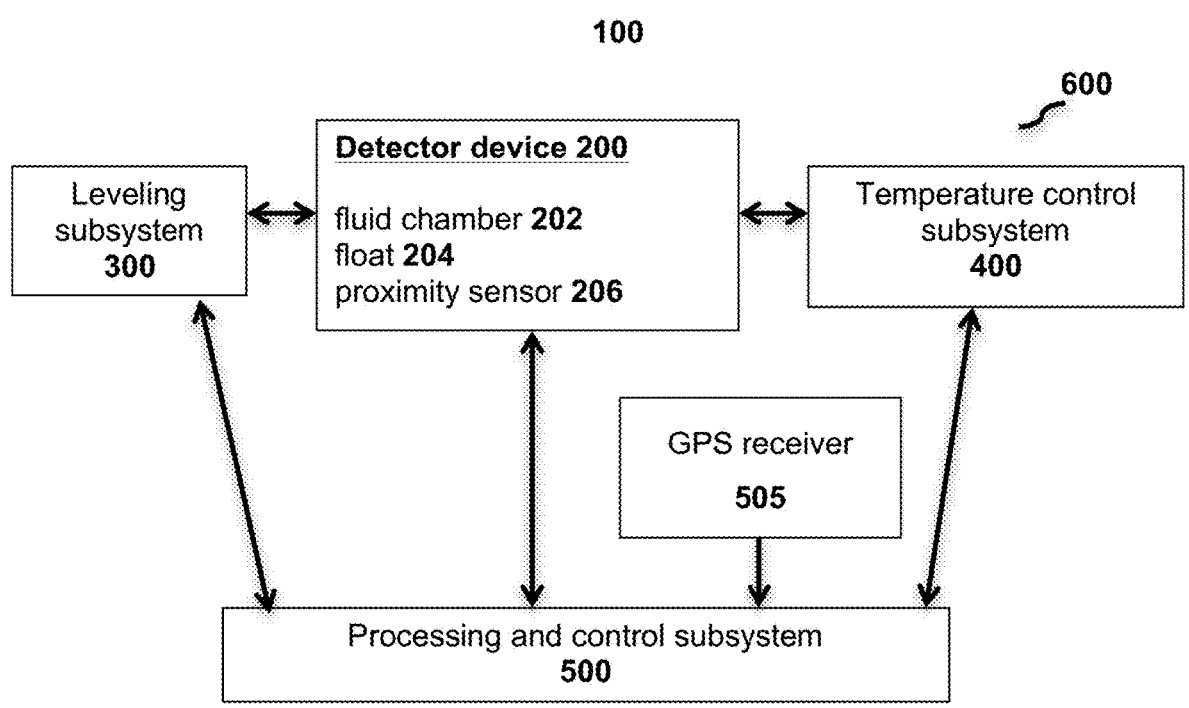
FIG. 1 shows an overview schematic diagram of a detector system for detecting below ground anomalies.

As shown in FIG. 1, a detector system 100 for detecting below ground anomalies includes a detector device 200 comprising a fluid chamber 202; a float 204 configured for floating movement within the fluid chamber 202; and a proximity sensor 206 configured to detect a position of the float 204. The fluid chamber 202 may comprise a balancing fluid 208. In some embodiments, the fluid chamber 202 and float 204 may be sealed. In some embodiments, the proximity sensor 206 may be a shielded proximity sensor. In some embodiments, the detector device 200 may further comprise a float centralizer 210 configured to center and/or retain the float within the fluid 208.

In embodiments, the detector system may further include a leveling subsystem 300 configured to level the detector device 200.

In embodiments, the detector system 100 may further include a temperature control subsystem 400 configured to maintain a controlled temperature of the detector device 200.

In some embodiments, the detector system may further include at least one processing and control subsystem 500 in communication with at least one of the proximity sensor 206, leveling subsystem 300, and/or temperature control subsystem 400.

In some embodiments, subsystem 500 may be configured to analyze and/or display data received from the proximity sensor 206. In further embodiments, subsystem 500 may be configured to receive location data from a GPS receiver 505. In further embodiments, subsystem 500 may be configured to receive user input data. In further embodiments, subsystem 500 may be configured to analyze, correlate, and/or display data received from the proximity sensor 206, location data received from the GPS receiver 505, and/or user input data.

In some embodiments, leveling subsystem 300 and/or temperature control subsystem 400 may be electronically and/or automatically monitored and/or adjusted. In embodiments, processing and control subsystem 500 may be configured to control and/or power the leveling subsystem 300 and/or temperature control subsystem 400.

In further embodiments, system 100 may include a system housing 600 for storing and/or transporting the detector device 200. According to various embodiments, the system housing 600 may further hold and/or provide a mounting base for components of the leveling subsystem 300, temperature control subsystem 400, and/or processing and control subsystem 500.

Detector Device 200

Figure 2A:
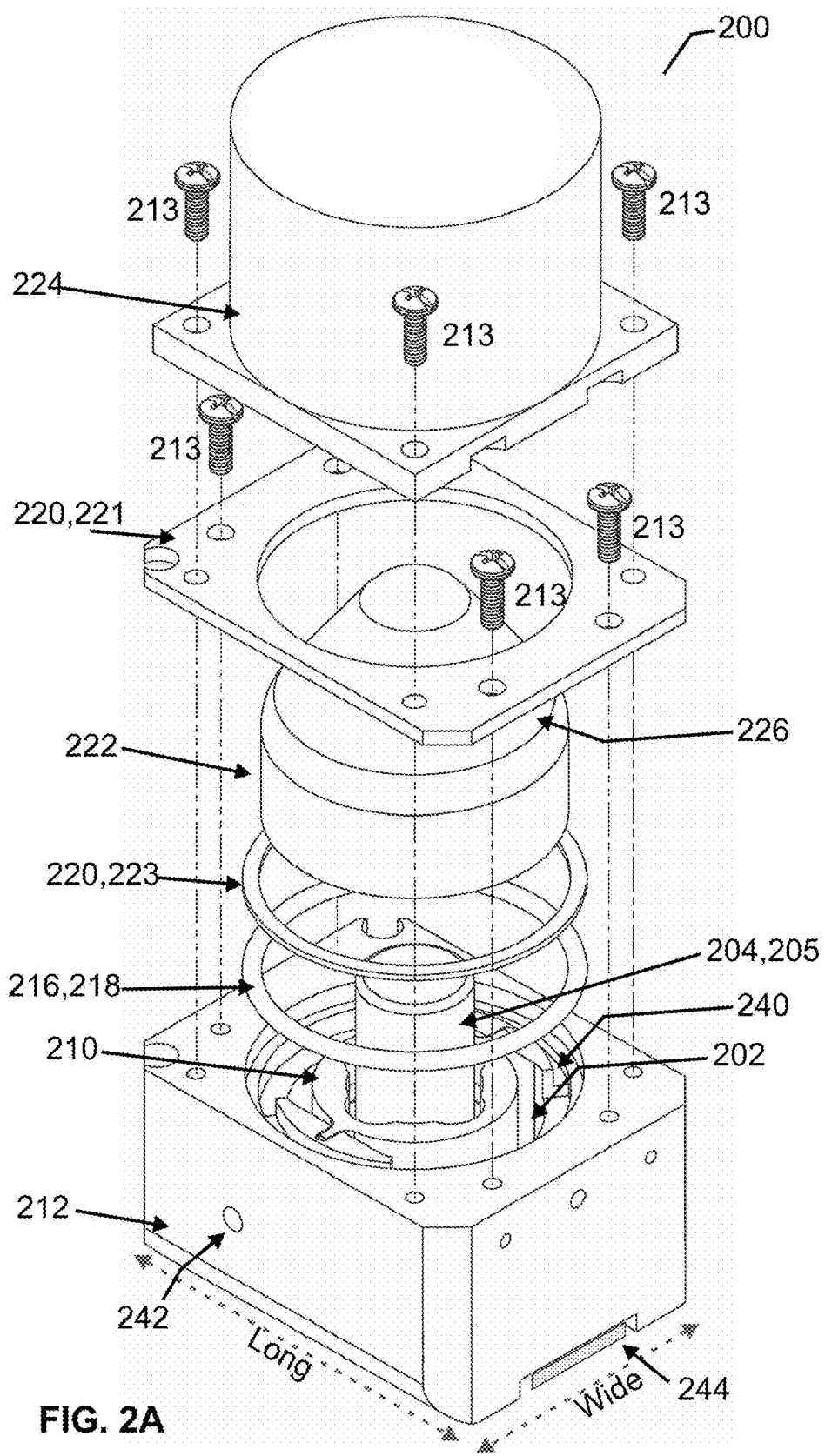
FIG. 2A is an exploded perspective view of a detector device for the detector system of FIG. 1, in accordance with various embodiments.

According to various embodiments, and with specific reference to FIGS. 2A and B, fluid chamber 202 including float 204, and proximity sensor 206 may be contained in a sensor housing 209.

In embodiments, the sensor housing 209 may form an enclosure 211 ("sensor housing enclosure") including or encapsulating the fluid chamber 202 and float 204. In some embodiments, the sensor housing 209 may further encapsulate the proximity sensor 206. In embodiments, sensor housing enclosure 211 may be airtight. In some embodiments, the sensor housing 209 may further include a thermal insulation element around the sensor housing enclosure 211. For example, multiple covers encapsulating airspace therebetween, and/or insulating material may be employed to increase insulation.

In embodiments, the sensor housing 209 may generally be formed from a non-conductive material, and may be compact for ease of transport and use. For example, the sensor housing 209 may be sized as follows: about 3.5 inches to about 5.0 inches in 'height' or about 4 inches in height; about 2.5 inches to about 4.0 inches 'long' or about 3.37 inches long; and about 2.5 inches to about 4.0 inches 'wide' or about 2.71 inches wide.

In some embodiments, the sensor housing 209 may include an assembly of at least one base 212 and at least one cover 214, which may be joined to create a substantially airtight seal around sensor housing enclosure 211. According to various embodiments, the seal may serve to prevent the liquid 208 from leaking and/or environmentally isolate the enclosure 211.

The base 212 and cover 214 may be joined, for example, using various fasting/coupling elements 213, such as screws, bolts, etc., and/or may interconnect via various coupling mechanisms, for example, a threaded connection, friction fit, etc. In further embodiments, a sealing element 216 (e.g. O-ring, sealant, etc.) may be used. For example, an O-ring 218, and various O-ring compressing/retaining member(s) 220, may be provided. O-ring compressing/retaining member(s) 220 may include, for example, a compression ring 221, and retaining plate 223 as shown in the figures. In embodiments, the coupling elements/mechanisms may allow for easy disassembly of base 212 and cover 214 when needed (i.e. for recalibration, device maintenance, etc.)

In some embodiments, the sensor base 212 may be formed from a tough material. According to an exemplary embodiment, the base 212 may be milled from food grade DURLIN® Plastic. Other methods of fabrication may include molding, and 3-D printing.

In some embodiments, sensor housing 209 may include an inner cover 222 and an outer cover 224, wherein a space 225 may be formed between covers 222 and 224, to provide thermal insulation. In embodiments, both inner and outer covers may be supported on the base 212. For example, the inner cover 222 may be inserted into the base 212 and held in place via the retaining side plate 223 and a retaining top element 238, which may be, for example, a foam piece, and the outer cover 224 may be attached to a top surface of the plate 223, as shown in the figures.

In embodiments, inner cover 222 may have an inwardly projecting top portion 226("dome top"), as shown in the figures. Additionally, the float 204 may be configured to position approximately below the dome top 226.

The inward projection the dome top 226 may prevent retention and/or adhesion of the fluid 208 at top portion 226 by facilitating draining. Additionally the dome top 226 may be coated with a surfactant to further facilitate draining and prevent fluid from sticking to the walls of the dome top 226. Thus, the level of fluid 208 may be substantially maintained, and settling time may be shortened, for increased stability and system accuracy.

According to various embodiments, fluid chamber 202 may comprise at least a portion of the sensor housing enclosure 211, which is filled with fluid 208. In embodiments, fluid chamber 202/enclosure 211 may include a cavity 240 molded or milled within the base 212. The fluid chamber 202 may be filled with a fluid 208, which serves as a float medium for the float 204. In embodiments, fluid may be filled up to about the inwardly projecting top portion 226 of the inner cover 222. In some embodiments, the fluid 208 may be injected through a fluid injection port 242 within the sensor housing 209 (see FIG. 2A). In some embodiments, the injection port 242 may be within the base 212, as shown in the figures. According to various embodiments, the fluid 208 may occupy a volume of approximately between about 60 to 80 CC within fluid chamber 202/enclosure 211.

In embodiments, the fluid 208 may comprise a balancing fluid, which may be a low-viscosity fluid and/or low surface tension fluid according to various embodiments. In some embodiments, fluid 208 may comprise a hydrocarbon fluid. In some embodiment, a non-hydrocarbon fluid may be used. In some embodiments the fluid 208 may be a synthetic or non-synthetic fluid. In embodiments, the fluid 208 may be a synthetic hydrocarbon fluid, such as 0W-20 oil.

In embodiments, the float 204 may comprise a substantially hollow body 205 ("float body 205"), which may be filled with air or other gas. In some embodiments, the float 204 may be cylindrically shaped, as shown in the figures. Additionally, the float 204 may comprise a target element 207, configured for detection by the proximity sensor 206. The target element 207 may be attached at the bottom end 228 of the float 204.

According to various embodiments, the float body 205 may be made of a rugged material, which may have a low coefficient of thermal expansion. Such material may include quartz, glass, and/or PYREX® glass, for example.

The target 207 may be formed from a metallic, non-ferrous substance such as aluminum. The range of thickness and diameter of the target 207 may be determined by the operational parameters of the proximity sensor 206. For instance, the diameter should be large enough for detection, taking into account the range of free motion of the target (which may be limited by the float centralizer 210), and detection range of the proximity sensor 206. According to an exemplary embodiment, for a 3 mm range proximity sensor, and wherein the centralizer 210 may have a inside diameter of about 32 mm, the target may have a thickness of between about 1.5 mm and about 3 mm, and a diameter of about 31 mm for reliable detection.

Additionally, the float 204 may be calibrated and configured such that the target 207 remains within detection range. In embodiments, the distance between the target 207 and sensor 206 with a 3 mm range, may be between about 1 and 2 mm. In some embodiments, the edge 230 of the target 207 may be rounded or sharpened so as to minimize a potential point of contact with the float centralizer 210.

According to an exemplary embodiment, the float 204 includes a quartz cylinder float body 205, and aluminum disk target 207, which are joined by heating the air within the float body 205, then attaching it to the surface of the target 207. An epoxy may also be applied to the surface of the target 207 at the attachment site. Thus, when the heated air within the float body 205 is cooled the float body 205 and target 207 are vacuum-sealed as well as bonded.

In embodiments, float Centralizer 210 may serve to center the float 204 and/or target 207 in order to limit its range of motion and to provide an even detection surface with respect to the sensor 206. In embodiments, the centralizer 210 may comprise a centralizer ring 232, which inserts into the base and remains immersed in fluid 208.

Additionally, the target may include a float retainer 234 configured to retain the float within the fluid chamber. In embodiments, the float retainer 234 may comprise an inwardly extending top ring 236 having a diameter slightly larger than the float body 205, but smaller than the target 207; while the centralizer ring 232 may have a diameter slightly larger than the target. As such, the size of the target prevents the float from moving upwards past the top ring 236. Additionally, the centralizer 210 may serve to maintain circulation of the fluid, and thus increase thermal stability by allowing the target to move up and down, for example, during transport of the device 200.

According to various embodiments, the proximity sensor 206 may comprise a shielded proximity sensor, which may be an eddy current sensor. According to an exemplary embodiment, the proximity sensor may be a Micro-Epsilon® Eddy Current sensor. In some embodiments, the sensor may be a miniaturized design. According to an exemplary embodiment, the sensor may be a (Model no. NCDT3700) Micro-Epsilon® Eddy Current sensor. Though sensor range may vary, it was found that a shorter-range sensor (e.g. 3 mm) has increased sensitivity compared to longer ranges (e.g. 6 mm or more), while the longer range sensors have increased stability. According to an exemplary embodiment, the sensor may have a 3 mm range, wherein the target 207 is positioned within about 1.5 mm from the sensor.

Figure 3:
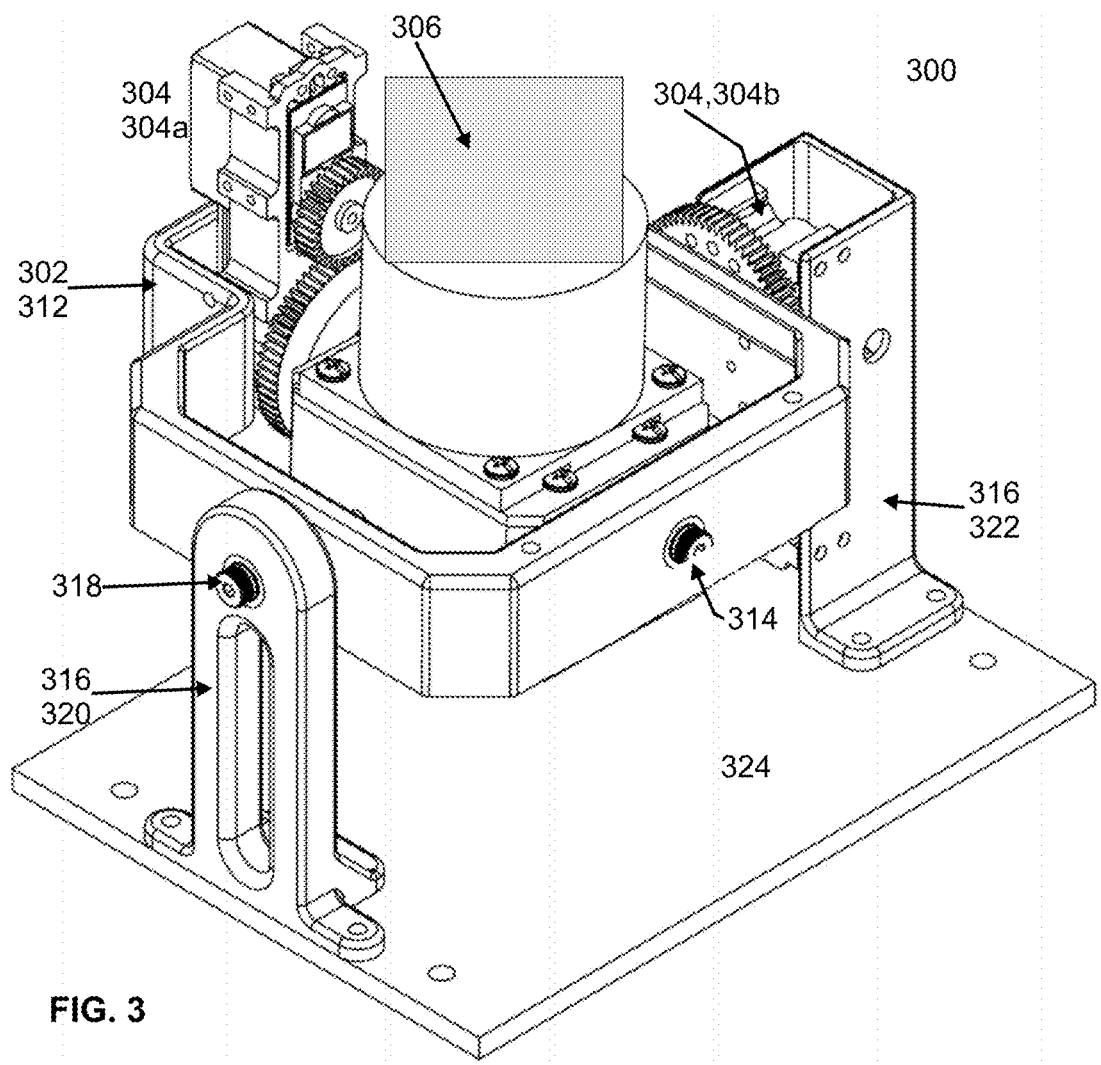
FIG. 3 is a perspective view of a leveling subsystem for the detector system of FIG. 1, in accordance with various embodiments.

According to various embodiments, the sensor 206 may transmit signals based on target proximity readings to a sensor data processor 306 (see FIG. 3). The sensor data processor 306 may then transmit the readings to the processing and control subsystem 500, for further processing and/or data analysis. In embodiments, sensor data processor 306 may convert signals from the sensor 206 into 0-10 Volt readings. In embodiments, a cable may connect sensor 206 and sensor data processor 306; however, in some embodiments, signal transmission from sensor 206 and sensor data processor 306 may be wireless.

Use of a shielded sensor was found advantageous in that electrical and magnetic interference (e.g. from a cable connection or other sources) is effectively eliminated. Thus, sensitivity due to cable positioning, and other potential interference is eliminated, to increase sensitivity and accuracy.

Leveling Subsystem 300

According to various embodiments, and with particular reference to FIG. 3, the leveling subsystem 300 is configured for leveling the detector device 200 prior to taking readings. In embodiments, leveling subsystem 300 may be computer controlled and/or automated. In some embodiments, the leveling subsystem 300 may include at least one pivoted support 302 ("gimbal support") for the detector device 200, which is configured to level the device 200 (i.e. produce an approximate zero tilt) with respect to the direction of gravity. In embodiments, the gimbal support 302 may be multi-axial. In embodiments, the gimbal support 302 may be configured for automated tilt adjustment of the detector device 200. In embodiments, level adjustment of the detector device 200 may be controlled by at least one servo motor gear assembly 304, wherein the servo motor may be in communication with at least one tilt sensor 244 in the detector device (see FIGS. 2A and 2B) via at least one tilt sensor processor 289.

According to an exemplary embodiment, the gimbal support 302 may be a dual axial support, as shown in FIG. 3. The support 302 may include a first axial support 312 to which the sensor device 200 may be pivotally coupled (e.g. at the base 212). In embodiments, a tilt of the sensor device 200 about a first tilt axis 314 with respect to the first axial support 312 may be controlled via a first servo motor gear assembly 304a. Additionally, the first servo motor gear assembly 304a may be coupled to and/or retained by the first axial support 312.

The first axial support 312 may be pivotally coupled to a second axial support 316 wherein a tilt of the first axial support 312 about a second tilt axis 318 with respect to the second axial support 316 is controlled via a second servo motor gear assembly 304b. As shown in the figure, the second tilt axis 318 may be orthogonal to the first tilt axis 314. Additionally, the second servo motor gear assembly 304b may be coupled to and/or retained by the second axial support 316.

In embodiments, the first axial support 312 may comprise a frame structure, as shown in the figure. The second axial support 316 may comprise a first support leg 320 and a second support leg 322 on 90 degree offset sides (opposite sides) of the frame structure of the first axial support 312. In embodiments, the first and second support legs 320, 322 may be mounted on a base plate 324, as shown in the figures. In embodiments, base plate 324 may be a plastic plate.

In embodiments, first and second servo motor gear assemblies 304a and 304b may include DC motors, and various gear elements, including any number of gear wheels, various gear sizes, etc.

In embodiments, the tilt sensor 244 and/or tilt sensor processor 289 may be in communication with the first and second servo motor gear assemblies 304a and 304b, respectively, to control and maintain an approximate zero tilt of the detector device by adjusting the tilt of the sensor device 200 and/or first support frame 312 about the first tilt axis 314 and/or second tilt axis 318 respectively. In embodiments, tilt sensor processor 289 may receive signals from tilt sensor 244 related to the first and second axial tilts of the sensor device 200, and provide a control output to the servo motor gear assemblies 304a and/or 304b in order to control a tilt of the device 200. In embodiments, tilt sensor processor 289 may utilize a tilt control module including software and/or hardware within the tilt sensor processor 289 for providing leveling control. According to an exemplary embodiment, the tilt sensor processor 289 may be connected via a cable to the tilt sensor 244. However, communication between the tilt sensor processor 289, servomotors, and/or tilt sensor 244 may be wireless and/or through a wired connection, according to various embodiments. Additionally, according to an exemplary embodiment, power to the tilt sensor processor 289 and servo motor gear assembly 304 may be controlled via the processing and control subsystem 500 (see FIG. 5A).

While the leveling subsystem may be automatic, as described above, in some embodiments, leveling may be manual or partially manual. For example, an electronic tilt sensor may be used to indicate tilt level, while tilt adjustment of the device 200 may be manual.

Temperature Control Subsystem 400

According to various embodiments, the temperature control subsystem 400 may be configured to maintain a steady temperature of the sensor device 200. According to various embodiments, temperature control subsystem 400 may be automatically controlled via processing and control subsystem 500.

In embodiments, and with particular reference to FIGS. 4 and 6A-C, the sensor device 200 may be contained within system housing 600 (see FIGS. 6A-C), which may provide a substantially insulated environment. Additionally, as described below, various heating and/or cooling elements 403 of the temperature control subsystem 400, which may be contained inside or around system housing 600 may also function to maintain a steady temperature (e.g. at extreme weather conditions) of the device 200 and/or environment of the system housing 600. In some embodiments, an internal fan may also be run to circulate air within the housing 600. (See FIG. 5A).

In some embodiments, temperature control subsystem 400 may employ at least one temperature sensor 246 (i.e. 246a, 246b, or 246c) to monitor the temperature at or around the sensor device 200. (See FIGS. 2B, and 5A-B).

Figure 2B:
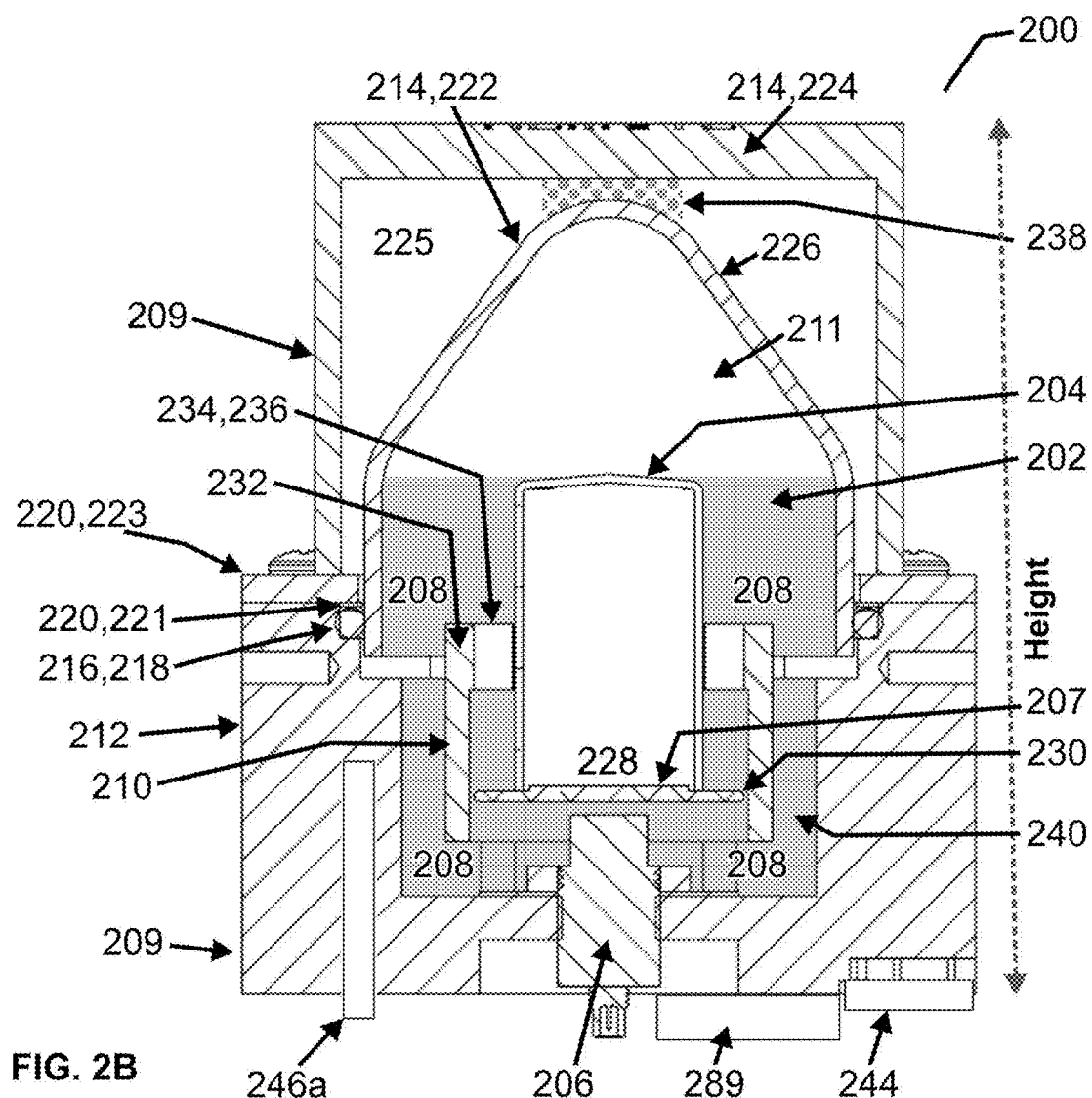
FIG. 2B is a cross section view of the detector device of FIG. 2A.

In embodiments, at least one temperature sensor 246 (e.g. 246a) may be located within the sensor device 200 (See FIG. 2B). According to various embodiments, temperature sensor 246 may be located within the sensor housing 209. For example, temperature sensor 246 may be embedded within the base 212, as shown in FIG. 2B. In other embodiments, the temperature sensor 246 may be positioned, for example, within the fluid chamber 202 and or sensor housing enclosure 211. Other temperature sensor(s) may be located within the system housing 600 outside the sensor device 200 itself. Other temperature sensor(s) may be located outside the system housing 600. The temperature sensor(s) 246 may be in communication with processing control subsystem 500, which may function to control the heating and/or cooling elements 403 of temperature control subsystem 400, such that a steady system temperature is maintained. The system may be set at various temperature settings, as long as a steady temperature is maintained, according to various embodiments. In embodiments, the temperature setting may be based on average temperature in the vicinity, such that the need to operate system 400 is minimized. For example, the system temperature may be set to between about 70 degrees F. and about 80 degrees F., or at about 78 degrees F., for mild climates regions.

According to various embodiments, and with particular reference to FIG. 4, heating of an internal compartment 602 of the system housing 600 may be achieved via a resistive heating element 405 located within the compartment 602. The resistive heating element 405 may comprise, for example, 3 resistors, which may be 15 Ohm 10 Watt resistors.

According to various embodiments, cooling may be achieved via a heat exchange system 401, as shown in FIG. 4. As shown in the figure, heat exchange system 401 may comprise an internal cooling system 402 ("internal radiator and fan system") comprising an internal radiator 402a and an internal fan 402b, which may be a sealed system, located and/or mounted within the system housing 600. In embodiments, heat exchange system 401 may further comprise an external heat exhaust system 404 ("external radiator and fan system") comprising an external radiator 404a and an external fan 404b, which may be a sealed system, located and/or mounted externally of system housing 600.

In embodiments, the pump unit 406 may include two circulation pumps ("fluid pumps") which may force cooled fluid to circulate through the internal radiator 402a via cooling fluid hoses 408, and hot fluid to circulate through the external radiator 404a via heating fluid hoses 410 in order to effectuate cooling of the internal compartment 602 and sensor device 200. Fans 402b and 404b may force air through the radiators 402a and 404a, respectively, to achieve the cooling and heat dissipation. (See FIG. 4). In embodiments, the pump unit 406 may further comprise a thermoelectric heat pump ("TEC") between the fluid pumps, which transfers heat from the internal to the external system. Thus, when cooling inside the housing 600 is required, power is applied to the fans and the TEC to pump heat from the inside to the outside. In the non-cooling mode, power is removed which will stop the flow of fluid from the inside radiator/fan and thermally isolate it from the outside. Such dual heat exchange system was found effective in preventing undesired heating which would occur with a single heat transfer pump system when the system is turned off.

According to various embodiments, the internal radiator and fan system 402 may be mounted within the system housing 600 via a retaining bracket 412, which may be mounted to the housing 600 via a mounting plate 413. In embodiments, the retaining bracket 412 may have ventilation holes. In some embodiments, the internal radiator and fan system 402 may be mounted with a slight tilt, as shown in the figure.

In some embodiments, the system housing 600 may comprise an insulated container, such as a Yeti® cooler, wherein an opening 603 may be cut through the housing wall 606 to allow insertion of the hoses 408 between pumps 406 and internal radiator 402a. In embodiments, once the hoses 408 are inserted, the cut out wall may be reformed and re-insulated.

Figure 6A:
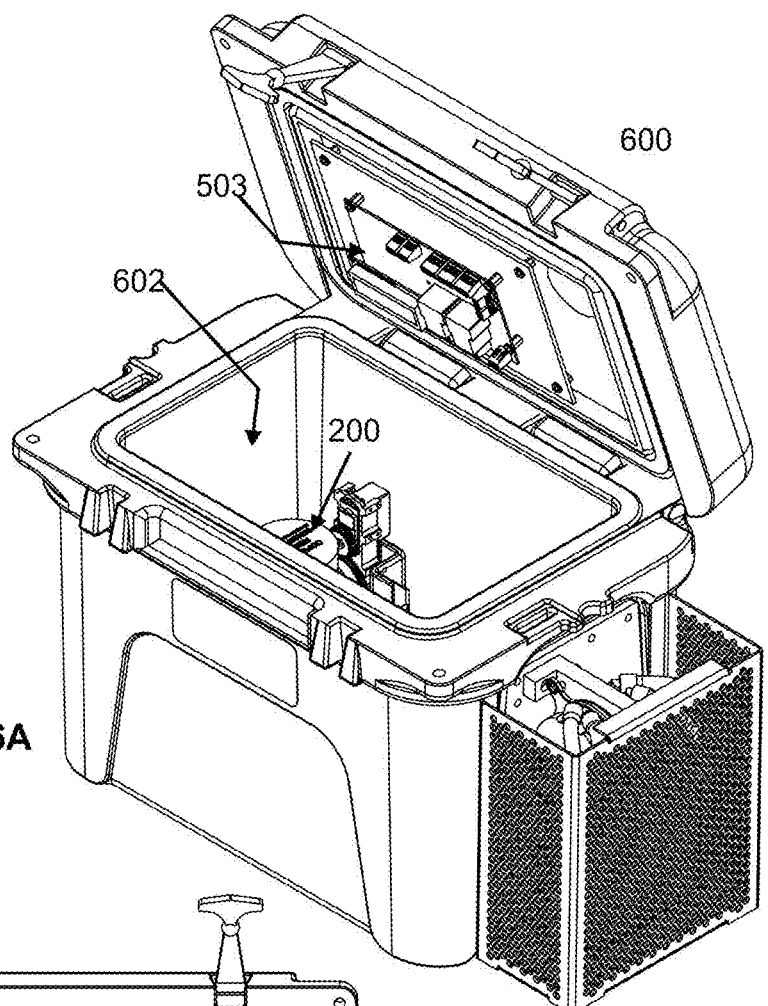
FIG. 6A is a perspective view of a housing for the detector system of FIG. 1, in accordance with various embodiments.
Figure 6B:
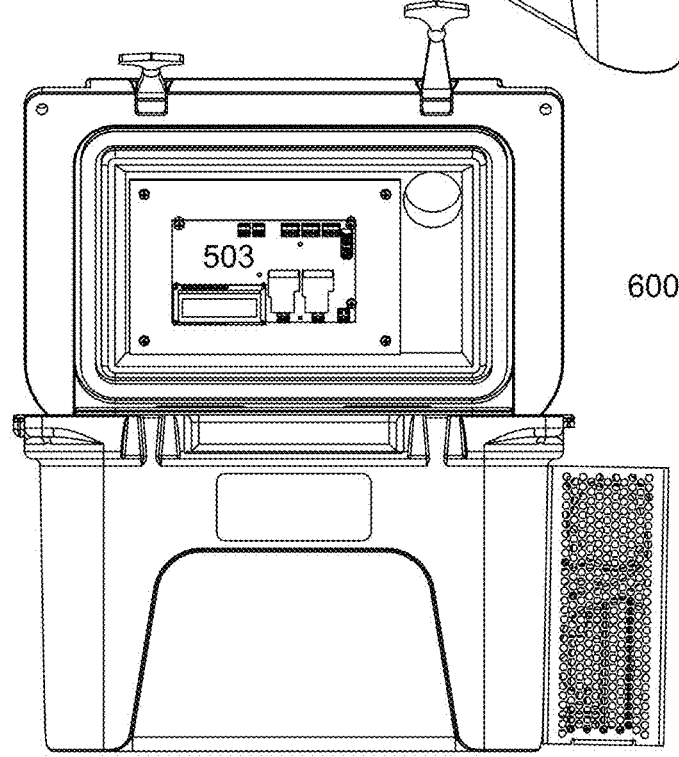
FIG. 6B is a plan view of the housing of FIG. 6A, in accordance with various embodiments.
Figure 6C:
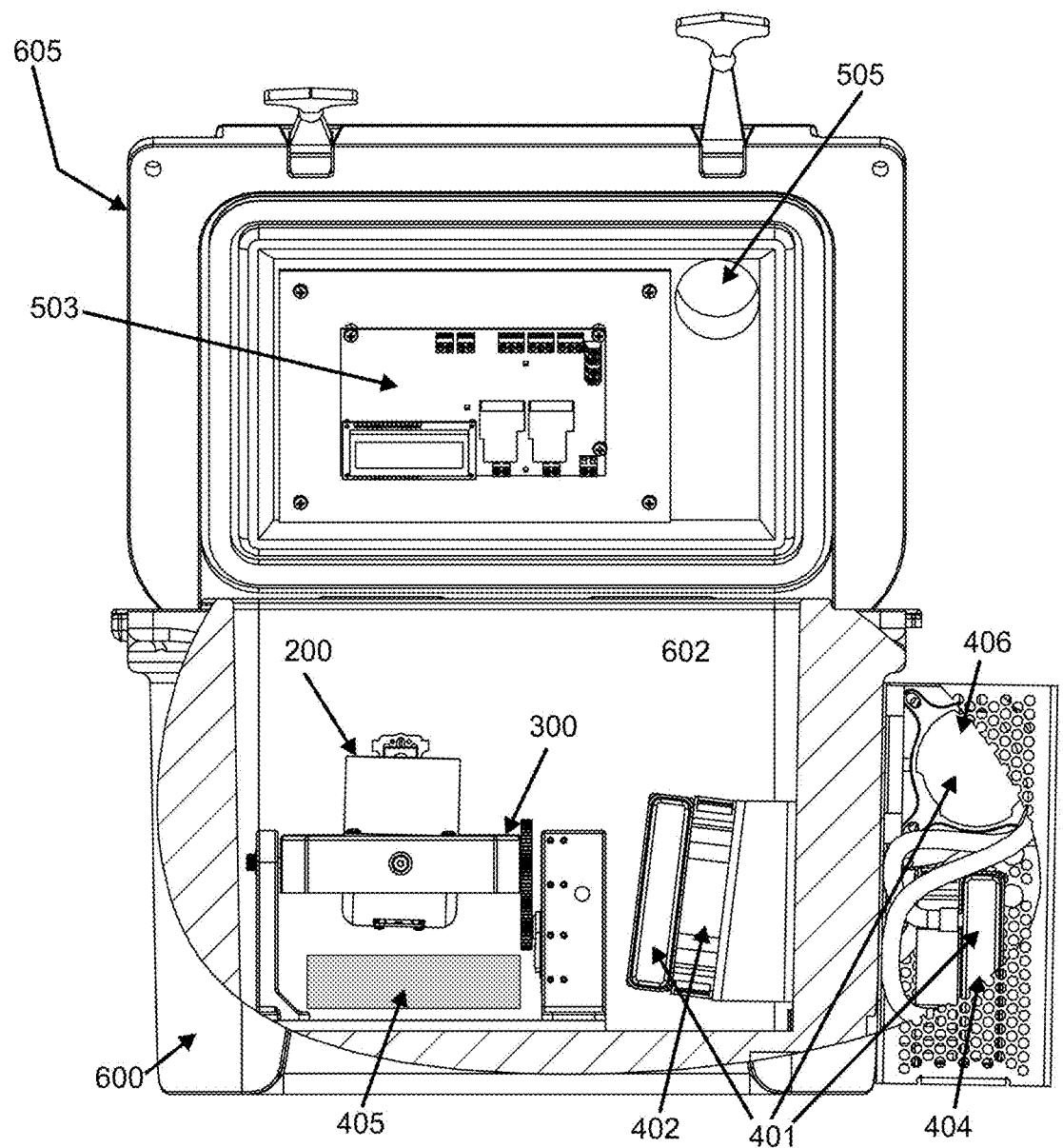
FIG. 6C is a plan view of the housing of FIG. 6A, wherein, for illustrative purpose, a section of the housing wall is depicted as removed in order to show the system/subsystem components within the housing, in accordance with various embodiments.
Figure 6D:
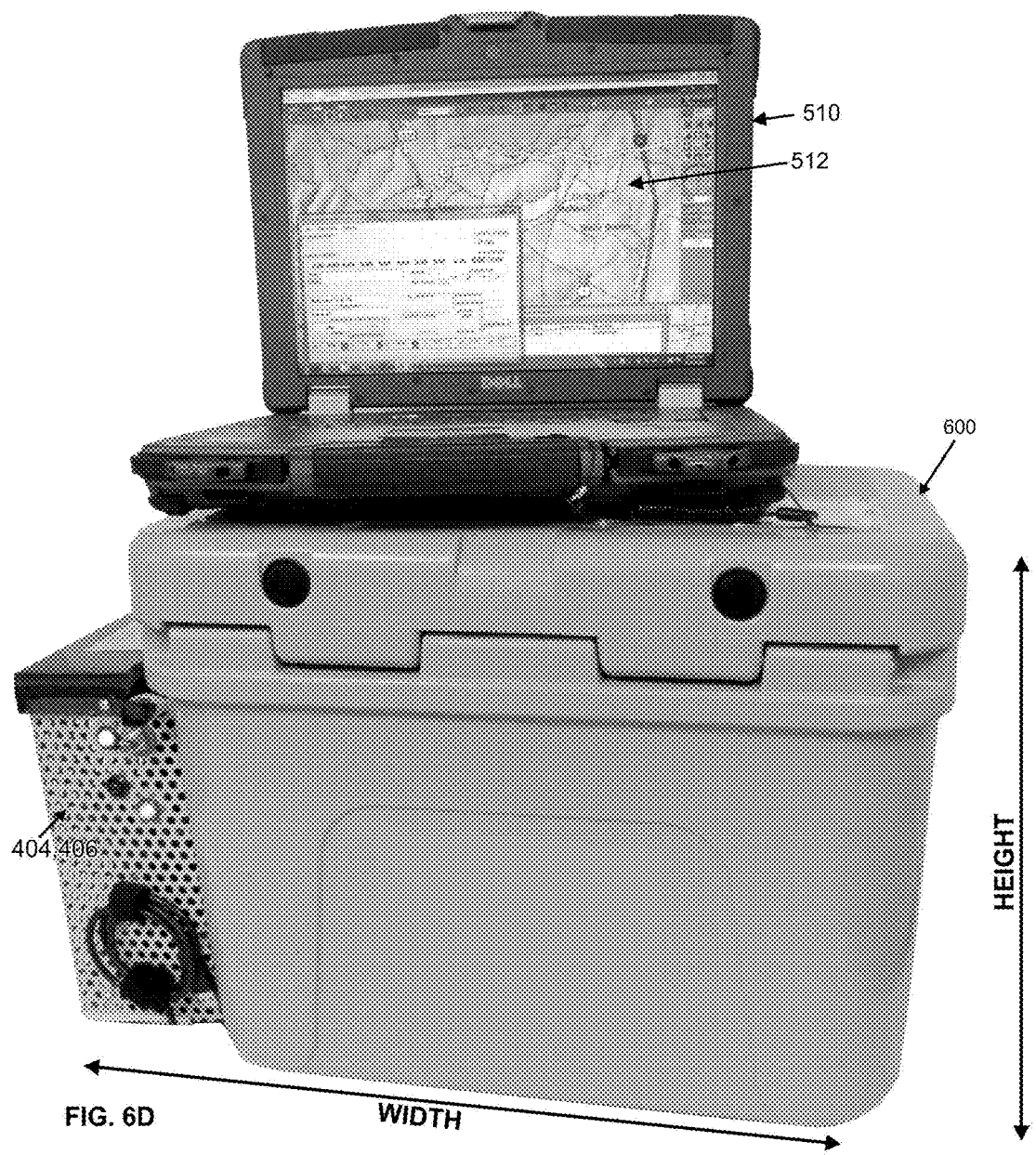
FIG. 6D shows the housing of FIG. 6A, with a housing cover in a closed position and with a laptop, in accordance with various embodiments.

Additionally, heat transfer pumps 406 and/or external radiator and fan system 404 may be mounted outside the housing 600 using various mounting elements 414, such as brackets, frames, and/or retaining elements, etc., which may include ventilation holes, according to various embodiments (see FIGS. 6A-C).

In embodiments, pumps 406 may be run when cooling is desired in order to provide a constant temperature environment. A combination of cooling or heating run times and sensor insulation, with a hysteresis effect, results in keeping the temperature within the desired range.

The above described temperature control system was found to regulate temperature to within +/−0.3 degrees F., using a Yeti® Cooler housing (Yeti Roadie 20 Cooler), having a width of 23 inches, and height of 14 inches. It was found that control of the temperature keeps the density and surface characteristics of the fluid 208 constant, and enables improved repeatability and sensitivity, thus increasing the reliability of the device for multiple and accurate measurements.

Processing and Control Subsystem 500

Figure 5A:
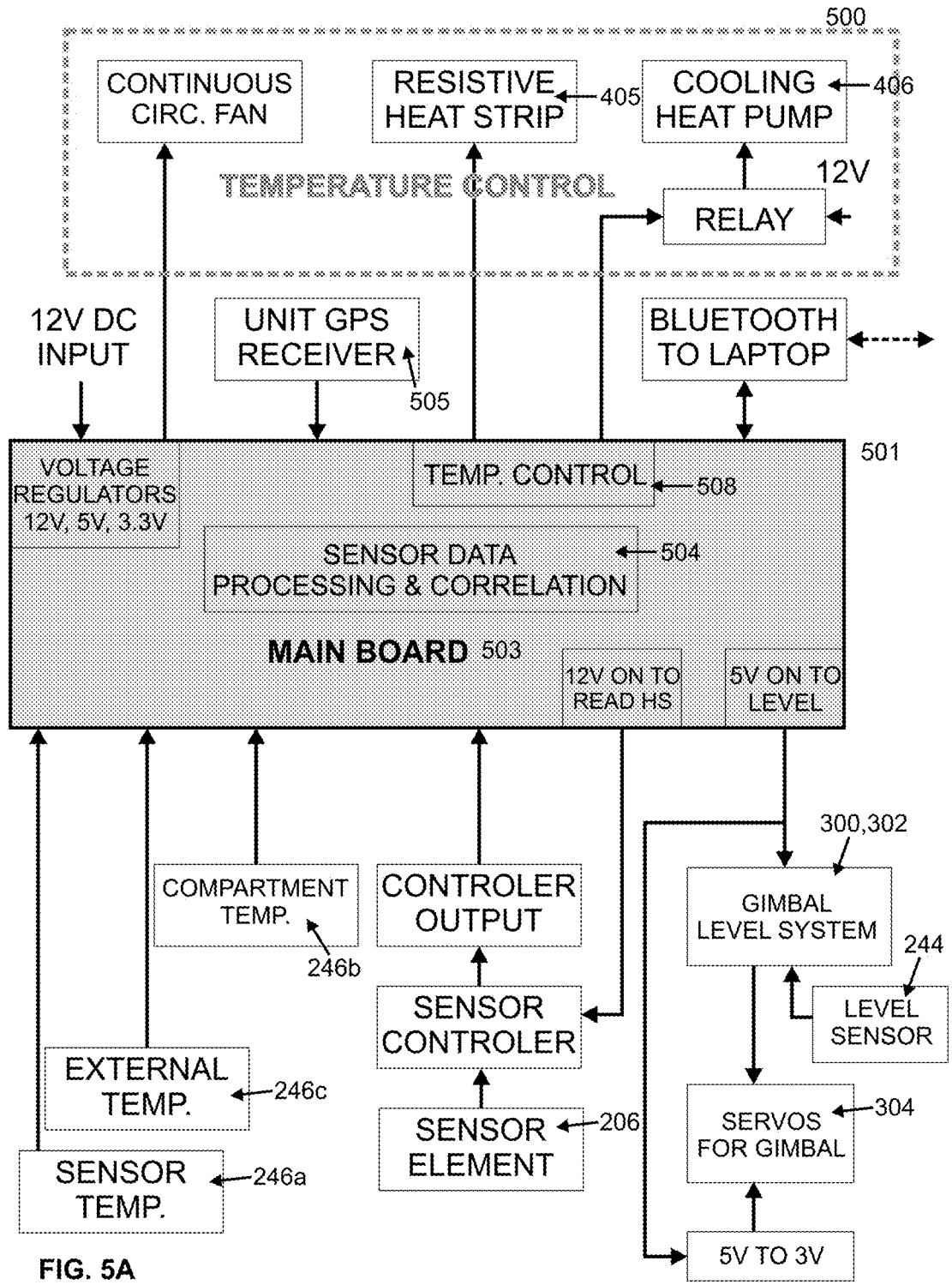
FIG. 5A is a block diagram for a processing and control subsystem for the detector system of FIG. 1, in accordance with various embodiments.

According to various embodiments, and with particular reference to FIGS. 5A and B, processing and control subsystem 500 may be configured to process, correlate, and/or display sensor reading data via a sensor data processing and correlation module 504. In some embodiments, sensor data may be combined with GPS location data received through the GPS receiver 505 and/or user input data. In further embodiments, processing and control subsystem 500 may be configured to receive input from at least one sensor 246 and/or control the temperature control subsystem 400 via a temperature control module 508. In further embodiments, processing and control subsystem 500 may be configured to power the leveling subsystem 300.

In embodiments, sensor data processing and correlation module 504, and/or temperature control module 508, may be implemented via software and/or hardware implemented through at least one processing and control unit 501. In embodiments the processing and control unit 501 may include a microprocessor based mother-board 503 ("main board 503"). In some embodiments, the main board 503 may be stored within the system housing 600. For example, the main board 503 may be installed within a cover 605 of the housing 600, as shown in FIGS. 6A-C. In further embodiments, the GPS receiver 505 may also be installed within the cover 605.

Figure 5B:
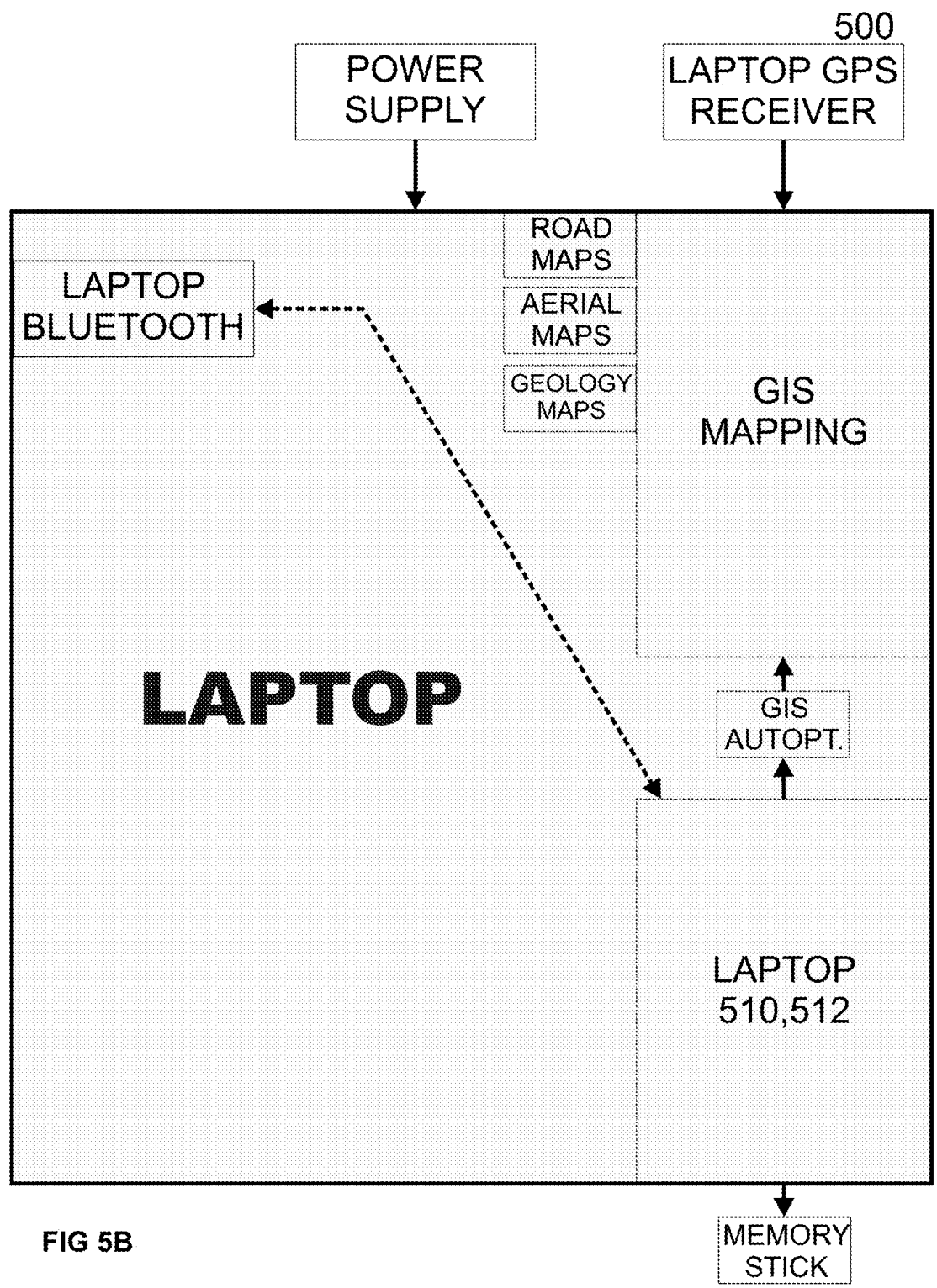
FIG. 5B shows a laptop component of the processing and control subsystem of FIG. 5A, in accordance with various embodiments.

According to various embodiments, processing, correlating, and/or display of sensor reading data via a sensor data processing and correlation module 504 may comprise receiving sensor data from the proximity sensor 206 via the sensor data processor 306. In embodiments, location data may be received from the GPS receiver 505. In embodiments, sensor data may be correlated with location data. In embodiments, processing, correlating, and/or display of sensor reading data may be carried out using a processor device 510 including a display screen 512. The processing device 510 may be a laptop. In embodiments, processing device 510/laptop may be in communication with the main board 503 via a wired (including USB cable) or wireless connection (e.g. Bluetooth or RF). For example, the main board 503 and device 510 may communicate via a Bluetooth connection. In some embodiments, a second GPS receiver ("laptop GPS Receiver") may be in communication with the device 510/laptop, as shown in FIG. 5B. In embodiments, data received from the second GPS receiver may be used for separate location mapping on the laptop.

Figure 7A:
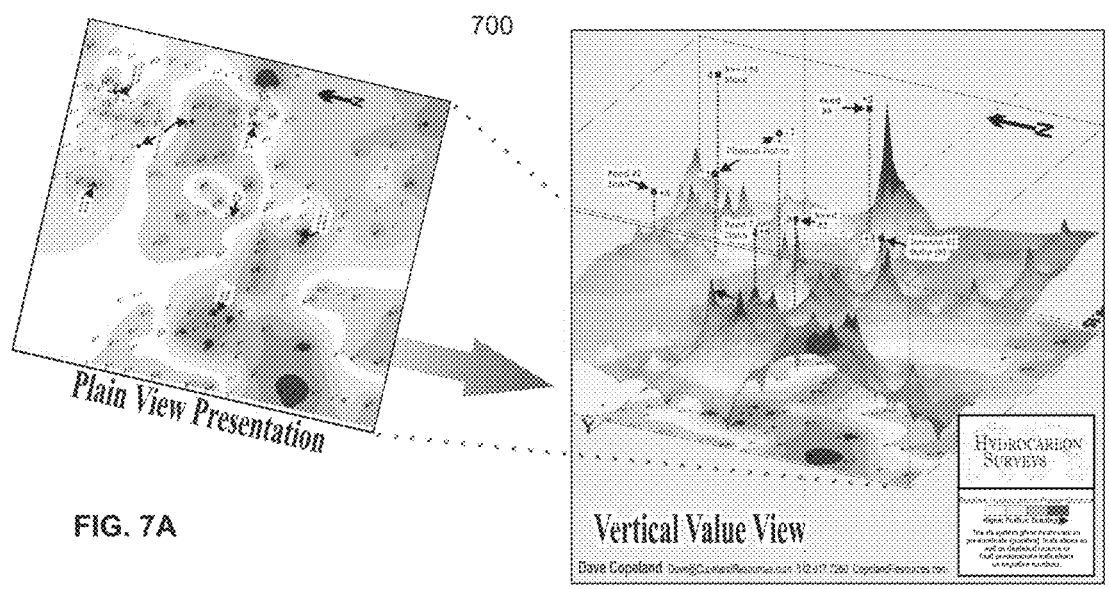
FIG. 7A shows an example of GIS maps for displaying sensor data.
Figure 7B:
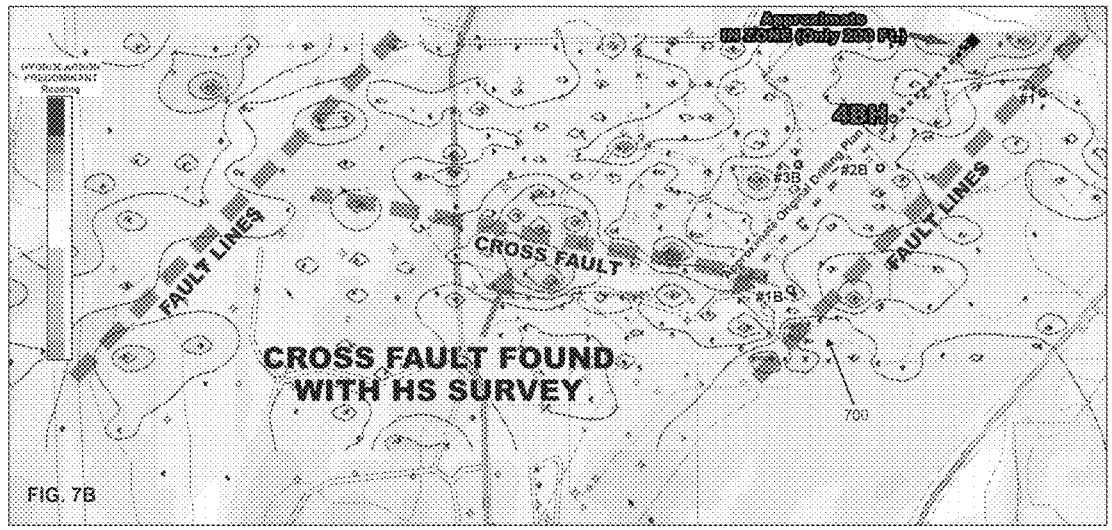
FIG. 7B shows another example of a map for displaying sensor data, wherein a detected fault line is shown on the map.
Figure 7C:
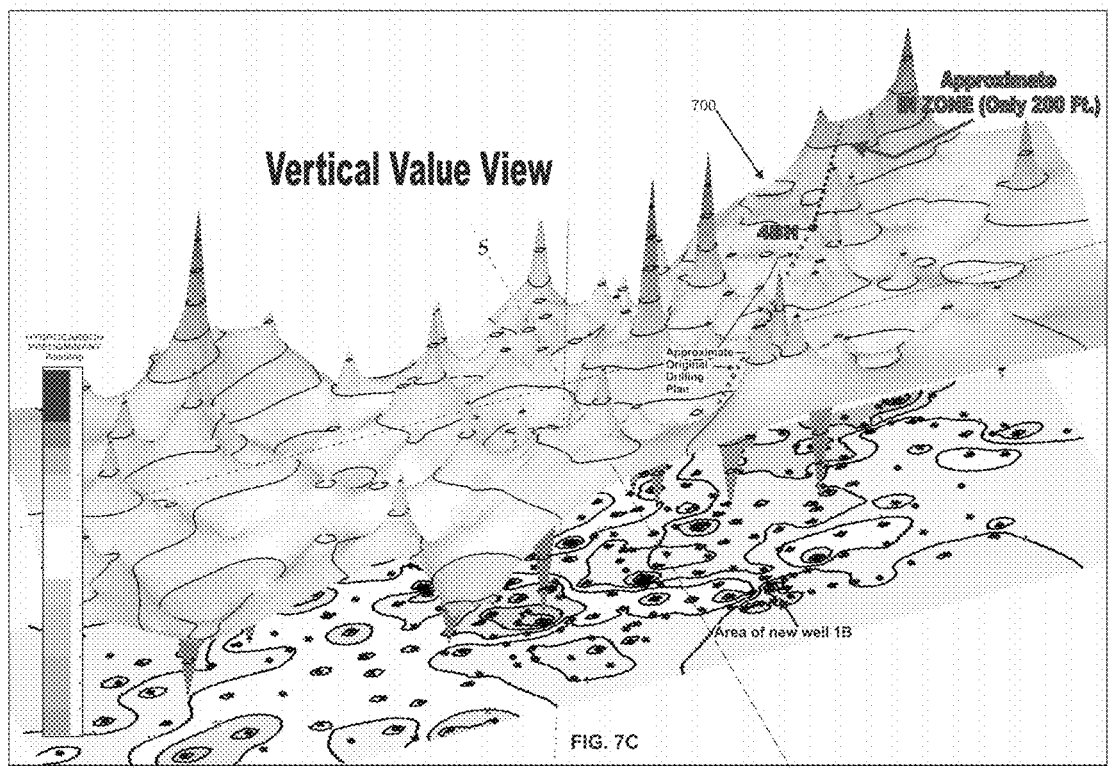
FIG. 7C is another example of a map for displaying sensor data, wherein the map is a vertical value view map.

According to various embodiments, the received and/or correlated data may be presented on the display screen 512 in various formats including GIS mapping 700, vertical value view, and/or dot format (see FIG. 7A-C).

According to various embodiments, interpretation of the readings may comprise comparing an individual reading taken at a specific location to an average of readings taken around the location/i.e. within the same field. According to various embodiments, an average may be based on readings taken from about 10 to about 1000 acres, or more, depending on the terrain and/or anomalies. In some embodiments, system 500 interim results may indicate the need for a user to take more or less measurements at a given location.

In embodiments, known geological data may be used to enhance results by combining the readings with such known geological data to produce a more complete picture. Thus, an integrated, multi-layer, color graphical presentation of the processed data may include GIS integration with the user's existing geological data layers.

According to an exemplary embodiment, to collect sensor data at a given location, a user may press a key on the laptop to start the measurement process. A reading (i.e. final reading) may be a reading taken at the end of a predetermined time period. The final reading may be stored along with the GPS information in a CSV file. In embodiments, a reading may comprise a 0 to 10 volt input signal from the sensor data processor 306. The main board 503 may take multiple readings from the proximity sensor 206/sensor data processor 306 around a region, and average those multiple readings, then compare that average to an individual reading.

In embodiments, temperature input received from the at least one temperature sensor 246 may be used to control the heating and/or cooling elements 403 of temperature control system 400 via temperature control module 508. According to an exemplary embodiment, temperature measurements may be received from a detector temperature sensor 246a located within the detector device, a compartment temperature sensor 246b located within the system housing 600 outside of the detector device, and an external temperature sensor 246c located outside the system housing 600. Then, based on the temperature data received, the temperature control module 508 may determine if cooling or warming of the system is needed, and if so, provide a control output to effectuate heating or cooling via the heating and/or cooling elements 403 (e.g. By powering either the resistive heating element 405 or heat transfer pumps 406). In some embodiments, a circulation fan may be run, either continuously, and/or upon heating or cooling.

In embodiments, subsystem 500 may also be used to power (turn on) the leveling subsystem 300.

Thus, according to various embodiments, subsystem 500 (through processing and control unit 501/main board 503) may control the system temperature, activate leveling subsystem 300, receive and/or process data from the sensor data processor 306 and GPS receiver 505, and communicate with the processor device 510/laptop. In some embodiments, the device 510/laptop may be used to change and control various settings and/or functions (e.g. set system temperature, power various systems, etc.). In further embodiments, subsystem 500 (through processing and control unit 501/main board 503) may be configured to measure and record voltages with respect to time, for diagnostic purposes.

Method of Detecting an Underground Anomaly 800

Figure 8:
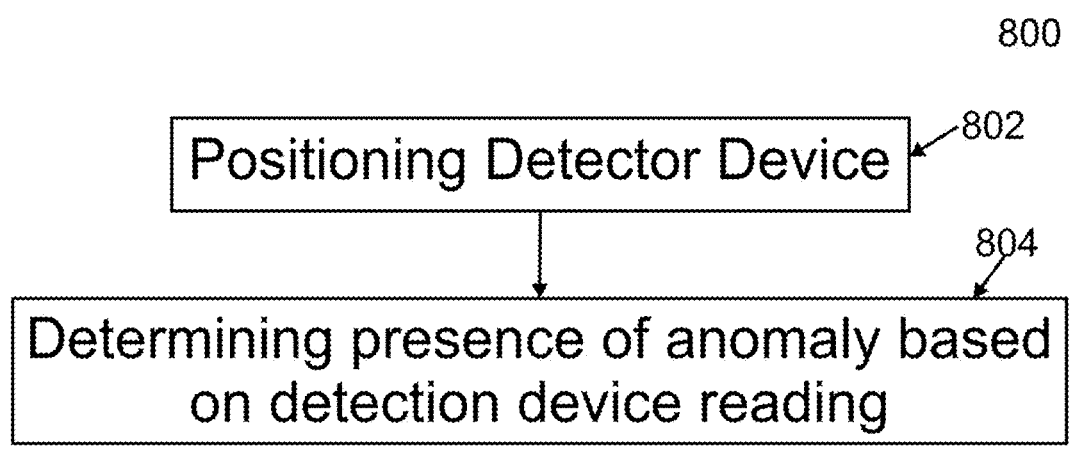
FIG. 8 shows a detector method for detecting below ground anomalies.

According to various embodiments, and with reference to FIG. 8, a method of detecting an underground anomaly 800 may comprise a step of positioning a detector device at a detection location (step 802), and determining the presence of an anomaly based on the detected reading. (Step 804)

In embodiments, determining the presence of an anomaly may be based on multiple readings, which may be correlated to different locations.

According to an exemplary embodiment, multiple readings may be obtained by transporting the detector device (e.g. via vehicle) to various locations. At each location, the device and vehicle may be allowed to settle (e.g. by waiting approximately 5 seconds), and then the device may be automatically leveled prior to taking a reading. A GPS reading may also be taken with the sensor reading, and the sensor data may be correlated to the GPS data. Once a reading is made at one location, the vehicle may be driven to the next location for the next reading, and the process may be repeated.

In embodiments, each reading may be logged with the GPS coordinates and automatically displayed on a PC using GIS mapping system. This may allow a user (technician) to informally interpret the progression of readings as they are taken and modify the positioning following a reading when interesting features are seen (as each reading is posted on a map). The specific readings and some diagnostic information may be logged into a CSV file automatically by a microprocessor controller for more formal post processing after a survey session.

According to an exemplary embodiment, the above described system and method may require about 10 seconds or less for leveling the device, and about 20 seconds for a reading. Additionally, the disclosed detector device 200 may weigh about 25 pounds and may run of a vehicles 12-volt supply. Thus, a user may log points from within the vehicle at a rate of about 30 to 40 per hour, depending on terrain limitations to travel time. As such, the process of obtaining multiple readings according to the disclosed method and system may be very quick and efficient.

Additionally, the disclosed method/system was found to have sensitivity, which allows meaningful variations to be detected on points that are less than 20 feet apart for oil and gas measurements. Near surface caves or voids, the disclosed system was found to have a horizontal resolution of less than 2 feet.

In embodiments, the disclosed device may be placed in the back of a vehicle and operated by a technician with a laptop the front of the vehicle. This enables measurements to be made in an unobtrusive and confidential manner. For road reconnaissance prospect assessment a standard vehicle may simply make stops along a road with only one or two operators who stay in the vehicle. Within a lease, a grid pattern is run.

Additionally, the disclosed system has "pin pointed" detection capabilities, and has been shown to monitor geological changes directly below it to the point of noting being above a vertical slip fault and then getting a normal reading after moving about 15 feet horizontally off of the fault. The disclosed system has been shown to give a net cumulative reading, positive, of hydrocarbons directly under the sensor system and a net cumulative, negative, reading of faults, voids (e.g. open spaces, sink holes, sewer lines, etc.). In the case of combined forces, the negative is subtracted from the positive effects.

The detailed description set forth herein in connection with the appended drawings may be intended as a description of exemplary embodiments in which the presently disclosed may be practiced. The term "exemplary" used throughout this description means "serving as an example, instance, or illustration," and should not necessarily be construed as preferred or advantageous over other embodiments.

This detailed description of illustrative embodiments includes specific details for providing a thorough understanding of the presently disclosed. However, it will be apparent to those skilled in the art that the presently disclosed may be practiced without these specific details. In some instances, well-known structures and devices are shown in block diagram form in order to avoid obscuring the concepts of the presently disclosed method and system.

The foregoing description of embodiments may be provided to enable any person skilled in the art to make and use the subject matter. Various modifications to these embodiments will be readily apparent to those skilled in the art, and the novel principles and subject matter disclosed herein may be applied to other embodiments without the use of the innovative faculty. The claimed subject matter set forth in the claims may be not intended to be limited to the embodiments shown herein, but may be to be accorded the widest scope consistent with the principles and novel features disclosed herein. It may be contemplated that additional embodiments are within the spirit and true scope of the disclosed.

What may be claimed is:

1. A detector system for detecting underground anomalies comprising:
    a detector device, comprising:
    a housing;
    a fluid chamber within said housing, the fluid chamber containing a fluid, wherein said fluid chamber is sealed;
    a float positioned within the fluid chamber, said float comprising a sealed chamber having an upper end and a lower end with a target attached at the lower end, wherein said float is configured for free floating movement in said fluid;
    a proximity sensor within said housing, said proximity sensor positioned beneath said target and configured to detect a distance of said target from said proximity sensor,
    wherein a presence of an underground anomaly is determined based on said detected distance.

2. The detector system of claim 1, wherein the proximity sensor is a shielded phase shift proximity sensor.

3. The detector system of claim 1, wherein said fluid is a hydrocarbon fluid.

4. The detector system of claim 1, further comprising a centralizer for centering the float and/or target.

5. The detector system of claim 1, further comprising a leveling system comprising a tilt sensor configured to sense a tilt of the detector device.

6. The detector system of claim 5, wherein the leveling system further comprises an automated leveling gimbal in communication with the tilt sensor, and configured to level the device.

7. The detector system of claim 1, further comprising an automated temperature control system, wherein the automated temperature control system includes a) a cooling system and/or a heating system, at least one temperature probe configured to measure a temperature inside or around the device, and a control system configured to control the cooling system and/or heating system based on temperature information received from the at least one temperature probe.

8. The detector system of claim 7, wherein the cooling system comprises a dual heat exchange system comprising at least two fluid pumps, and a thermoelectric heat pump between the fluid pumps.

9. The detector system of claim 1 further comprising:
a temperature control system.

10. The detector system of claim 1, further comprising a temperature control system including a cooling system, wherein the cooling system comprises a dual heat exchange system comprising at least two fluid pumps, and a thermoelectric heat pump between the fluid pumps.

11. The detector system of claim 1, wherein the detector system is contained in an insulated housing.

12. The detector system of claim 1, further comprising a centralizer for centering the float and/or target, wherein the centralize comprises a centralizer ring.

13. The detector system of claim 1, further comprising a leveling system.

14. The detector system of claim 13, wherein the leveling system further comprises a leveling gimbal.

15. The detector system of claim 1, said float comprising a float body, wherein the target is attached at a lower end of the float body, wherein a diameter of the float body is smaller than a diameter of the target.

16. The detector system of claim 15, further comprising a float retainer configured to retain the float within the fluid chamber, wherein the float retainer comprises a ring having an inner ring diameter, wherein the inner ring diameter is larger than the diameter of the float body and smaller than the diameter of the target.

17. The detector system of claim 1, further comprising a float retainer configured to retain the float within the fluid chamber.

18. The detector system of claim 1, wherein the underground anomalies comprise at least one of hydrocarbons, hydrocarbon bearing formations, faults, voids, or disturbances underground.

* * * * *